United States Patent
Lefebvre et al.

(10) Patent No.: US 10,223,735 B2
(45) Date of Patent: Mar. 5, 2019

(54) METHOD FOR ORDERING AND DISTRIBUTING A PRODUCT ORDERED ONLINE

(71) Applicant: Worldline, Bezons (FR)

(72) Inventors: Guillaume Lefebvre, Meurchin (FR); Jacques Poly, Orchies (FR); Colombe Herault, Lille (FR); Denis Faivre, Lille (FR)

(73) Assignee: WORLDLINE, Bezons (FR)

( * ) Notice: Subject to any disclaimer, the term of this patent is extended or adjusted under 35 U.S.C. 154(b) by 265 days.

(21) Appl. No.: 15/024,556

(22) PCT Filed: Sep. 24, 2014

(86) PCT No.: PCT/FR2014/052393
§ 371 (c)(1),
(2) Date: May 19, 2016

(87) PCT Pub. No.: WO2015/044589
PCT Pub. Date: Apr. 2, 2015

(65) Prior Publication Data
US 2016/0307261 A1    Oct. 20, 2016

(30) Foreign Application Priority Data
Sep. 24, 2013 (FR) ..................... 13 59199

(51) Int. Cl.
| | |
|---|---|
| *G06Q 30/00* | (2012.01) |
| *G06Q 30/06* | (2012.01) |
| *G06F 3/16* | (2006.01) |
| *G06F 17/27* | (2006.01) |
| *G06K 9/00* | (2006.01) |

(52) U.S. Cl.
CPC ......... *G06Q 30/0635* (2013.01); *G06F 3/167* (2013.01); *G06F 17/2765* (2013.01); *G06K 9/00456* (2013.01); *G06Q 30/0625* (2013.01); *G06Q 30/0633* (2013.01)

(58) Field of Classification Search
None
See application file for complete search history.

(56) References Cited

U.S. PATENT DOCUMENTS

| | | |
|---|---|---|
| 6,587,835 B1 | 7/2003 | Treyz |
| 7,780,081 B1 | 8/2010 | Liang |
| 2003/0070065 A1 | 4/2003 | Fleming |
| 2003/0158796 A1 | 8/2003 | Balent |
| 2008/0004978 A1 | 1/2008 | Rothschild |
| 2011/0196724 A1* | 8/2011 | Fenton ................. G06Q 20/108 705/14.16 |
| 2012/0096256 A1 | 4/2012 | Kim |
| 2013/0073543 A1* | 3/2013 | Nuzzi ................... G06Q 30/00 707/725 |
| 2014/0156392 A1* | 6/2014 | Ouimet .............. G06Q 30/0633 705/14.49 |
| 2015/0198998 A1* | 7/2015 | Nanda ................... G06F 1/3234 713/323 |

OTHER PUBLICATIONS

A Personalized Recipe Database System with User Centered Adaptation and Tutoring Support. Liping Wang Qing Li Department of Computer Science City University of Hong Kong. (2007) (Year: 2007).*
PCT/FR2014/052393 International Search Report dated Dec. 22, 2014 (6 pages).
PCT/FR2014/052393 Written Opinion dated Dec. 22, 2014 (7 pages).

* cited by examiner

*Primary Examiner* — William J Allen
(74) *Attorney, Agent, or Firm* — Brinks Gilson & Lione; John C. Freeman

(57) ABSTRACT

A system for ordering a product online includes a communicating object configured to order a set of products referenced in a database by means of an order signal (CMD), and a database for listing a set of products corresponding to the order signal (CMD). A server is in communication with said database and is configured to publish a list of said set of ordered products. A computer likely to validate said list such that the communicating object may be a mobile device provided with a processor, a random access memory (RAM) and a hibernation software program such that the processor is stopped and the content of the random access memory (RAM) is not kept when said communicating object has not been used for a predefined period, or depending on the status of the communicating object.

7 Claims, 1 Drawing Sheet

METHOD FOR ORDERING AND DISTRIBUTING A PRODUCT ORDERED ONLINE

This application claims priority to International Application No. PCT/FR2014/052393 filed Sep. 24, 2014 and to French Application No. 1359199 filed Sep. 24, 2013; the entire contents of each are incorporated herein by reference.

This invention relates to the domain of orders for products, manufactured or other goods for distribution.

Management of product orders is essential, for example for stock management or for distribution logistics, regardless of whether the products are manufactured goods, foodstuffs or other types of products.

To simplify the terms, a "customer" means a person who would like to buy a product and a "supplier" means a person or an entity capable of delivering or having the desired product delivered. Therefore, the supplier may be a manufacturer or a distributor.

In the field of mail order and e-commerce, the customer finds it helpful if it is easy to order and if ordered products are delivered within announced or reasonable times. From the supplier's point of view, it is helpful to know the products in which the customer is interested, either for information purposes or in the form of a purchase option or firm order.

As a general rule, when a customer wants to order, he must in particular identify the required products. Typically, the identification is made by filling in a form, either on paper or on a computer file.

Forms have been developed based on lists of available products that the customer can select with a single click, making use of computer technologies and particularly the Internet.

Such solutions in the form of lists are faster for the customer than manual input on a paper form or a computer form, but they are not fully satisfactory. For example, the identification of a product of interest becomes long and difficult if the list is long. It also means that a computer has to be powered up and at least one hand has to be free to select the product in the list, either by activation using a pointer, a keyboard, a touch screen, etc.

Such a manipulation for preselection of a product is not always possible, for example when the condition of the hand concerned is incompatible for use of said pointer, keyboard, touch screen, etc., typically this is the case when the hand concerned is doing something else, for example holding an object, or is wet, dirty, or when wearing gloves, etc.

This invention aims to overcome this problem.

According to one of its purposes with this aim, the invention relates to a system for a customer to order a product on line, including:

network equipment for access to the Internet (200), a smart object (I 00), including a control device (110) including at least one device among an optical capture device, au audio recording device and a magnetic or electromagnetic capture device, said smart object being capable of communicating with network equipment (200) and being configured to order a set of products referenced in a database (310) by an order signal (CMD), and a database (310) structured according to a set of sort criteria, referencing a set of products and including a search engine configured to list a set of products corresponding to the order signal (CMD).

It is essentially characterised in that it also comprises:

a server (300) accessible through the Internet, communicating with said database (310) and configured to publish a list of said set of ordered products on line from the database (310) using said smart object (100), and a computer (400) connected to the Internet that can access said server (300), through said network equipment (200) or other network equipment enabling access to Internet, to validate said list;

and in that the smart object is portable equipment provided with a processor, RAM (Random Access Memory), and hibernation software in which, when said smart object is not used for a predetermined duration or as a function of the state of the smart object, the processor stops and the content of the RAM memory is not kept.

"Processor" refers to any type of computer, for example including microprocessors, microcontrollers, DSP, CPU, etc.

The value of the predetermined duration may be recorded in memory. It would also be possible for the hibernation software to include a function that forces hibernation when the smart object has been used for a too long period, in other words for a duration exceeding a threshold value stored in memory. Alternately, or in combination, the hibernation function may also take account of the state of the smart object, for example the state of the battery, the duration of the previous use, etc.

Hibernation may also be triggered by a user action such as a prolonged press on a button that will be treated like a hibernation command.

In one embodiment, the control device (110) includes an audio recording device configured to implement a voice recognition step including identification of a set of at least one keyword in the voice recording and the verification that said at least one keyword corresponds to a database sort criterion, said order signal (CMD) including said set of at least one keyword.

In one embodiment, the database (310) comprises a history of the customer's purchases, the system including a computer configured to list ordered products using the order signal (CMD) combined with a history of the customer's purchases.

In one embodiment, at least some sort criteria in said database (310) are hierarchised, such that one sort criterion may be a subset of another sort criterion.

In one embodiment, at least some products in the database (310) are grouped in a set of predefined groups, each group being associated with a customer, identified by an individual name or an individual graphic symbol and corresponding to at least one database criterion; the customer can define and modify the individual name, the individual graphic symbol or the content of a given group.

In one embodiment, the database (310) comprises a memory space in which the customer can record correspondence between the name of a group and products in said group.

In one embodiment, the database (310) comprises a set of cooking recipes or communicates with a cooking recipe database.

In one embodiment, the content of each group is associated with a predetermined number of persons.

In one embodiment:

the order signal (CMD) is a voice signal, and the database (310) comprises a correspondence between the name of a group, products in said group and a number of persons;

the system including a voice recognition device and a computer configured to calculate the number of products to be listed for a given product group as a function of the number of persons recognised by the voice recognition device in the order signal (CMD).

In one embodiment, the system also comprises a sound reproduction device.

Other characteristics and advantages of this invention will become clear after reading the following description given as an illustrative and non-limitative example with reference to the appended figures in which.

Figure 1:
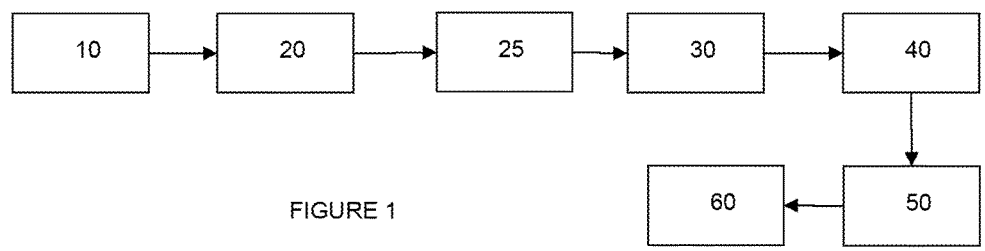
FIG. 1 shows an embodiment of the method according to the invention.

The general pattern for implementation of one embodiment of the disclosed method is shown in FIG. 1.

For conciseness reasons, the description considers only the case of a customer who would like to order from a single supplier, the customer possibly being one or several persons.

It is planned that the customer should be provided with a smart object 100 capable of at least preselecting the product due to a manipulation. Once the preselection has been made, the order is validated and sent to the supplier for delivery of the product.

These steps and the various embodiments of the system that make it possible particularly to implement these steps are described in detail below.

Smart Object

A smart object 100 means an appliance or a device that can set up a communication, particularly a wireless communication, with network equipment providing access to Internet.

The smart object 100 comprises electrical power supply means 130, for example batteries, or an electrical plug for mains power supply. It would also be possible for the electrical power supply means 130 to include induction charging means or photovoltaic power supply means.

Preferably, the smart object is a dedicated standalone device built into a box.

The small dimensions of the box, typically a few cubic centimeters (depending on the number of readers used and described below), are such that the box can be fixed on a door, for example of a household appliance (refrigerator, oven, etc.), a table or any other location practical for the customer. The smart object is advantageously a portable equipment, in other words it can be carried. For example, the box can be provided with support or attachment means for this purpose, for example a stand, a suction cup, a magnet or a hook, etc. The box may thus be placed on any surface, for example a horizontal or a vertical surface.

For example, the smart object does not have an operating system and includes onboard software in its processor.

The smart object is provided with a processor, a Random Access Memory (RAM) and hibernation software.

When the smart object is not used for a predetermined period, the processor is stopped and the content of the RAM memory is not kept, in other words it is lost, and is not stored in another memory such as a flash type memory.

Due to this characteristic, the electrical consumption of the smart object is also lower, its endurance is higher and its dimensions are smaller than a smart object equipped with the same sensors but including an operating system.

In particular, the simplicity of the system according to the invention, particularly due to its function dedicated to on-line product orders, enables very fast start up (boot) of this system, such that the content of the RAM memory can be lost when hibernation is activated. Since there is no longer any need to supply electrical power to the RAM memory, energy can be saved and the endurance of the smart object can be increased.

Unlike a smart object such as a portable telephone that has an operating system and that requires that an application should be run, the smart object may be activated:

permanently;

by programming: periodically (for example every x hours) or programmed (at a given time for a given activation time); or using an activation signal enabling the box to change from a standby or hibernation mode to an active mode.

The activation signal may be:

mechanical: for example using an on/off switch; or voice, using a voice command, electromagnetic, particularly optical, or through a signal notifying expiration of a predetermined timeout output from a time countdown device built into the smart object.

For example, it would be possible that the passage of a predetermined or an arbitrary image in front of the optical sensor would cause the box to change from standby mode to active mode. A sound or visual reproduction device could be provided, for example in the form of a beep or light indicator, to notify the customer that the box has changed to active mode.

For example, when the smart object is activated from hibernation, the processor starts immediately and the time between when the activation signal is sent and the end of awakening, in other words when the smart object reaches a state in which it is ready to respond to the user's action (for example ready to scan, to receive a voice command, etc.) is preferably less than 500 milliseconds. In practice, it is less than 300 ms, such that the customer perceives said activation as being practically instantaneous.

For wireless communication, the smart object comprises a wireless communication module 120, for example Wifi, GPRS or other, that it can use at least to send data to the Internet network, possibly through network equipment 200, for example a modem or a router at the customer's domicile, or at least on the place of use of said smart object. Preferably, the wireless communication module 120 is powered by electrical power supply means 130.

The smart object comprises a control device 110, preferably powered by electrical power supply means 130 that can communicate with the communication module 120.

The control device 110 comprises at least one device among an optical capture device, an audio recording device and a magnetic or electromagnetic capture device. Capture device and recording device typically mean a reader connected to a recorder. The advantage of all these readers is that they are contactless between said reader and the product. When the control device 110 is active, it sends an order signal CMD to the communication module 120 that forwards the order signal in the form of data using an appropriate communication protocol, for example TCP/IP, to the network equipment 200. The recording device may be onboard the processor, built into the box or it may be elsewhere in communication with the capture device (optical, audio or electromagnetic).

Optical Capture Device

The optical capture device is electrically connected to the processor and comprises at least one of the three combinable variants.

In a first variant, an optical capture device is provided in which two-dimensional images can be acquired, typically a camera.

In a second variant, an optical capture device is provided in which a sequence of images can be acquired, typically a video camera or a webcam.

In a third variant, an optical capture device is provided capable of reading a graphic code (for example 1D, 2D bar code, datamatrix, etc.), typically a bar code reader.

The optical capture device preferably functions in the visible range. When it is active, it sends an optical capture signal corresponding to the image in two dimensions (photo or graphic code), or to the sequence of successive images taken by it.

It may also be possible to provide an optical recognition device 140, configured to identify at least some of the characteristics that could be used to identify the product from said image or sequence of images. For example, an image recognition software may be provided, or an optical character recognition (OCR) software or graphic code recognition software. The software may be onboard or elsewhere, for example on a server and in communication with the smart object.

Figure 2:
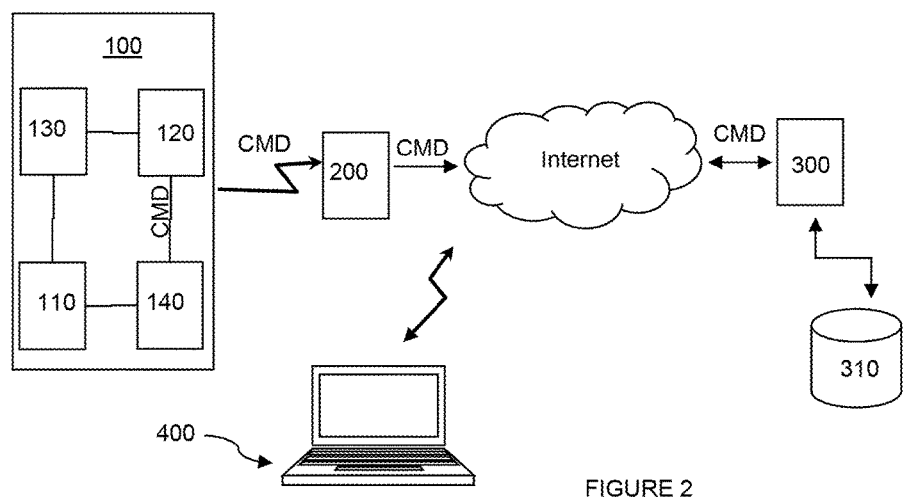
FIG. 2 shows an embodiment of a device capable of using the method according to the invention.

The optical capture signal may be sent to the communication module 120 directly, or indirectly through the optical recognition device 140 as shown in FIG. 2 in which the optical capture device 110 is coupled to an optical recognition device 140, typically image processing software. The optical recognition device 140 can be remotely installed on a server in communication with the smart object 100.

The optical capture signal is recorded at least temporarily, even in the case of a non-stop optical recognition.

After optical recognition, the order signal CMD is sent to the communication module 120.

Audio Recording Device

The audio recording device is electrically connected to the processor and comprises at least one audio transducer, in fact a microphone and preferably comprises recording means, in fact an audio recorder. A voice recognition device is also provided, typically a voice recognition software, coupled to the audio recording device on the smart object 100 or on a remote server, and configured to transform the voice signal recorded and coded using a known protocol into an order signal CMD. After voice recognition, the order signal CMD is sent to the supplier through the communication module 120 or by said remote server.

Sound Reproduction Device

The system may comprise a sound reproduction device, for example a loudspeaker or an acoustic vibrator, more frequently known under the term "buzzer".

The sound reproduction device is electrically connected to the processor.

The sound reproduction device may also be in communication with the database 310 or another database, such that it emits an audible signal recorded on the database and sent to the smart object.

Electromagnetic Capture Device

The electromagnetic capture device is electrically connected to the processor. It may be a sensor enabling contactless interaction by radiofrequency (NFC, RFID or other) when a product or an object carrying a compatible transmitter (label, badge or other) is brought in front of it at a communication distance. The electromagnetic signal generated by reading the transmitter may be saved in a memory.

Communication Module

A communication module 120 is electrically connected to the processor.

The optical capture signal at the output from the optical capture device before optical recognition, like the audio recording signal at the output from the audio recording device before voice recognition, contains so-called "raw" data, possibly fairly voluminous in terms of passband.

The recognition step (optical or vocal) may be performed entirely in the smart object 100, or entirely on a remote server, or partially in the smart object 100 and partially on a server (for example, audio processing consisting of extracting spectral data is made in the smart object 100 and only these data are sent to the server).

Therefore, the communication module 120 may transmit the following to the server, depending on the case:
  Said raw data (audio recording, image, sequence of images, etc.), or
  data resulting from preprocessing of these raw data.

A special-purpose module for reading symbols is used to retrieve previously reprocessed data (typically the value of the bar code) that can be sent to the server as they are.

Therefore for simplification reasons, an order signal CMD means the optical capture signal before or after optical recognition, or the voice signal before or after voice recognition, by reference to the end format of said order signal, and independently of the communication protocol used. The order signal CMD is sent 25 to a database 310 structured according to a set of sort criteria.

Supplier

It is planned that the supplier should have a database 310 referencing a set of products that he might distribute, in other words deliver or have delivered. The database is stored on a server 300 or in communication with a server connected to Internet, such that the order signal sent by the customer is transformed into a database query.

Preferably, the database comprises a set of markers or fields to sort products according to a set of criteria, in fact at least one of the following criteria: category, type, sort, make or trade name, internal reference, product content, AOC (controlled designation of origin), unit weight, etc.

For example a given bottle of wine may be recorded with category "wine", type "red", kind "Bordeaux", content "sulphites", etc.

Similarly, a strawberry yoghurt may be recorded with category "dairy product", type "yoghurt", kind "fruit", content "strawberry", etc.

Preferably, the sort criteria are sent to a web server accessible to a customer's computer.

Preferably, at least some markers are hierarchised. For example the "category" marker has a higher order than the "type" marker, that has a higher order than the "kind" marker, that has a higher order than the "content" marker, such that one marker may be a subset of another marker.

Each product is referenced in the database 310 by at least one marker. It is preferable but not compulsory for a product to be referenced by all markers.

Fields may be organised relative to each other, for example in the form of tables.

Operation

For reasons of conciseness, we will describe herein only one example in which products are consumer goods, specifically food products. This example can be generalised to all types of goods or products, for example office consumables or others, and the invention has an advantageous application for recurrent orders, for the reasons described below.

The first step when a customer would like to buy a product and would like to make an order to a supplier, is an acquisition step 10.

The acquisition step comprises acquisition of a voice signal or an optical capture signal, by voice recording or optical capture. Data acquired from the voice or optical acquisition signal are representative of the required product.

The next step is a transcription step 20 that comprises the recognition step (optical or voice) and in which the voice or optical recording is transformed into an order signal CMD.

In the case of a voice recording, the recording is transcribed by means of a voice recognition software that identifies a set of at least one keyword in the voice recording, such that at least one keyword corresponds to a database sort criterion.

Typically, a voice order may be processed by voice recognition software, for example including at least one correspondence table or heuristics to identify keywords corresponding to database sort criteria in the voice acquisition signal. The voice acquisition signal can then be transcribed into an order signal including these keywords identified in the form of instructions, for example in the form of fields or tags.

For example for a voice order such as "buy one bottle of Bordeaux", the voice recognition software identifies keywords such as "one", "bottle" and "Bordeaux". The transcription may use a correspondence table to associate each of these keywords with the sort criterion corresponding to it, in fact "one" is associated with the "number" criterion and "Bordeaux" is associated with the kind. Advantageously, the database is relational such that one criterion can be related to other criteria. In the previous example, the kind "Bordeaux" is for example related to at least the "wine" category.

In the case of optical capture, if the optical recording corresponds to the bar code of a product, the bar code is read and transformed into the corresponding order signal based on known techniques.

The barcode reader can unambiguously identify the corresponding product in the database if the database is sufficiently full. Otherwise, an exception process is performed in which the barcode is temporarily set aside so that a search for a correspondence can be made in order to add the missing reference into the base.

If the optical recording corresponds to a photographic image of the product, a known image processing software is used to identify some characteristic elements of the product, in fact by comparison with reference images recorded in a database, and to transform said characteristic elements into an order signal. Preferably, the product characteristic elements searched by the image processing software fully or partly correspond to sort criteria of the database. Typically, a divergent phase is performed in which acquired data are used to produce a set of characteristic data, followed by a convergent phase in order to deduce the article(s) in the base that will be added into the list, from these characteristic data.

For example with a photograph of a wine bottle label, the image processing software (that may include character recognition or graphic code recognition) may be configured to identify at least one element among the trade name, the designation, the wine maker's name, the logo, etc., or any other distinctive sign that can be transcribed in the order signal and can be used to identify the corresponding product in the database.

As we have already seen, the transcription step may be applied on the smart object or on a server in communication with the smart object, which can minimise resources used by the smart object. To simplify this description, it will be assumed that the transcription step is applied on the smart object.

After the transcription step, the order signal is sent to the supplier's information system, in fact on the database 300, through the Internet.

An identification step 30 is then provided during the convergent phase mentioned above, that comprises identification of the product required by the customer in the database, due to the content of the order signal, and this will also be used to check availability of said product in stock.

Database

As described above, the database 310 comprises a set of recordings referenced and classified according to sort criteria; each recording corresponding to a product, sort criteria at least partly corresponding to some characteristic elements of the product.

Each product is identified in the database 310 by a unique individual identifier. For example two products sold under the same denomination but with two different packagings have two different identifiers.

The database 310 advantageously comprises a history of the customer's previous purchases, the history for example including the list of identifiers of purchased products. It may also include rules, preferably defined by the customer or the supplier, and intended to facilitate the solution of problem cases (arbitration, substitution, promotions, etc.).

A search engine coupled with a processor is configured to search for the product required by the customer in the database 310, using the order signal CMD.

The identification step 30 is used to identify the product(s) satisfying the sort criteria that correspond to the sent order signal CMD, in the database 310.

When the product(s) has (have) been identified, a listing step 40 lists these products, in computer form.

Unambiguous Identification

If the product identification is unambiguous, all that can be listed is the identified product.

It would also be possible to list all products corresponding to at least one of the criteria of the unambiguously identified product. Preferably, at least all the products belonging to the lowest hierarchical criterion will be listed, so that the number of listed products can be limited.

It would be possible to list all products purchased during a given period or all products in the database corresponding to at least one of the criteria of the unambiguously identified product. Preferably, the unambiguously product is the first in the list.

For example, if optical recognition (barcode or graphic recognition) unambiguously leads to an order signal corresponding to a given strawberry yoghurt, then the list may include a list of strawberry yoghurts (for example from a given brand or different brands) or a list of fruit yoghurts.

It would also be possible to include thresholding in which, if the number of products listed belonging to the lowest hierarchical criterion is less than a threshold value, then all products belonging to the immediately higher hierarchical criterion will also be listed.

Ambiguous Identification

It may be impossible to unambiguously identify some products by optical or electro-magnetic recognition. For example, a given fruit or vegetable can sometimes be recognised, although the variety of this product cannot. Similarly, sometimes some voice orders do not unambiguously identify a product. In practice, a voice order is usually oriented towards a single more or less generic selection criterion, for example "tomatoes".

If the product identification is not unambiguous, it would be possible to list all products corresponding to the identified criteria. In this case, the keyword "tomatoes" lists all tomatoes in the database 310; the keyword "round tomatoes" lists all tomatoes in the database 310 that have the characteristic of being round.

Regardless of whether the identification is unambiguous or ambiguous, it would be possible to couple the identification to the history of the customer's previous purchases, which can minimise the number of listed products. Similarly, it would be possible to couple the identification to the rules determined for the database 310.

Thus, the keyword "tomatoes" lists all tomatoes in the database 310 that the customer usually orders, in other words all tomatoes ordered over a given period. If the customer usually buys only one type of tomatoes, then the product identification becomes unambiguous despite an order made through a generic selection criterion.

If the product identification is unambiguous, for example by optical barcode recognition, but the purchasing habit of said product applies to a different format (unit weight, quantity), it would be possible to list only the product usually purchased, which is particularly practical for products sold by batches; a single product in the batch is sufficient to list the batch.

Predefined Product Groups

Some products in the database 310 may be grouped according to a set of predefined groups, each group corresponding to a criterion in the database and being identified by an individual name or an individual graphic symbol, and associated with a customer.

Preferably, each individual name or individual graphic symbol in the group can be defined and modified by the customer, using software.

Preferably, the content of each group can also be defined and modified by the customer, using software.

Typically, each group of products comprises a determined number of determined products.

The name of a group may correspond to the title of a recipe. For example, it would be possible to include a group called "fruit salad", "ratatouille", "couscous", or "chocolate cake", the content of which includes a set of products in determined proportions necessary to make the recipe. Similarly, a group called "consumables" could be included, the content of which includes a determined number of pens, erasers, etc.

To achieve this, the database may include a memory space in which the customer can record the correspondence between the name of a group, products in said group, and optionally the number of persons. It would be possible for the database to include a set of cooking recipes or to communicate with a cooking recipes database.

The name of a group may be arbitrary and it may include different product types. For example, a group called "recurrent order" or "monthly order" may include a set of products previously defined by the customer, that the customer would like to order in a single order.

It would also be possible for the content of each group to be associated with a predetermined number of persons, for example according to a correspondence table.

Advantageously, the order for a group of products is made by the individual name or the individual graphic symbol of said group and an arbitrary number of persons. Thus, using the correspondence table, a computer can calculate the number of products to be listed for a single product group, as a function of the number of persons mentioned in the order.

For example, if the group "water" is associated with 6 identical bottles and 10 persons in the database, then
 the "water" order lists said 6 bottles;
 the "water 5 persons" order lists 3 of said bottles;
 the "water 20 persons" order lists 12 of said bottles;
 etc.

A step 50 is then included to publish the list on a server accessible to the customer, "on-line service" in the following and for example a web server. The on-line service is accessible, preferably securely, to the customer's browser or by means of a specialised application. Access to the list by the customer may include a customer identification step and it may involve a customer authentication step. Accessible to the customer means accessible to an Internet browser, the browser possibly being built into a smartphone, a computer 400, a tablet, etc.

Like the list of identified products, the order signal CMD may be considered as being a preselection of product(s) by the customer.

Browsing in this on-line service by the customer allows him to check the list, and possibly to select only some of the products, possibly to modify the required quantity and confirm his choices in a validation step.

Preferably, the validation step may include an on-line payment step, known in itself.

After validation, the ordered product referenced in the database 310 is distributed 60. Products selected by the customer are delivered by the supplier to an address known to the supplier, for example during the identification step.

From the supplier's point of view, knowledge of the list of the product(s) identified through the order signal allows him to manage his stocks better.

Since the supplier knows the customer's interest in a given product at a very early stage, in other words at the latest at the time of validation, the supplier can optimise delivery and reprocurement logistics.

Furthermore, if the order signal is not sufficient to identify a product in the database, for example because the product is not referenced in it, the supplier can nevertheless become familiar with some characteristic elements of the product of interest and can add this product or an equivalent to his catalogue if a number of customers larger than a threshold value are interested in this product.

From the customer's point of view, since the smart object is portable, the customer can transport it easily and order a given product or very quickly know whether or not this product is available at his supplier, for example by a simple optical reading.

Since the smart object is contained in a self-contained box, the customer can send an order signal even when his hands are full, dirty, wet, or if he is wearing gloves, etc. because the customer can manipulate the smart object in front of the product, or manipulate the product in front of the smart object. Thus, even if the product is wet or greasy for example, the smart object is not likely to be deteriorated by the manipulation. The smart object advantageously comprises an easy to access activation device and the attachment device for the smart object holds the object in place even if the user handles it, for example with his elbow.

The servers referred to herein can be a set of servers that may be distinct from each other, or a single server.

With the invention, it is possible to define the usage context of the order device, for example by automatic identification of the user, supplier, product category, quantity, or to set parameters for an immediate order or to cancel an order, in a predefined manner.

Reading a predefined particular code (barcode, RFID chip, voice order, image etc.) can cancel, correct or complete the order corresponding to the order signal (for example quantity).

If a magnetic or electromagnetic transmitter carried by a product or an object is a transceiver, it will be possible that the contactless interaction can also be two-directional. In this case, the smart object 100 can also transmit information to the product (for example write in an RFID tag, or send data to an NFC smartphone, etc.).

Finally, the smart object 100 can include an audio reproduction module, in this case a loudspeaker, to output audio messages to the customer.

Preferably, sound reproduction is triggered spontaneously or as a function of predetermined actions by the customer, typically in reaction to a customer action, for example to inform him that the order has been accepted.

Sound reproduction may for example be limited to beeps, which consumes very little electrical energy; and it may also consist of various audio messages (spoken message, jingle associated with a brand, promotion message, etc.).

For example the sound reproduction may be activated:
  to acknowledge an action (positively or negatively);
  to suggest a complementary article or to announce a promotion operation, possibly following a given action; or
  in response to a visual or audio trigger by the customer, or an information request from the customer.

When a customer pronounces a predetermined keyword in the microphone, for example the keyword "promo" or "promotion", the processor of the smart object decodes the keyword and sends an audio message to the customer through the loudspeaker presenting current promotions, downloaded from a database. For example "tomatoes are 30% off today".

The customer can react to said audio message by pressing on a button or activating one of the devices among the optical capture device, the audio recording device and the magnetic or electromagnetic capture device of the control device 110, for example by pronouncing another order keyword such as "add" to add an article on promotion to his list.

It could also be possible for the smart object to include a light reproduction device, in this case a set including at least one light emitting diode (LED), that also limits electrical consumption. For example, green, orange and red LEDs could be provided, the diodes being activated selectively in a predetermined and programmed manner in the processor.

For example, the green diode is activated if the customer order is accepted, the orange diode is activated if a communication problem occurred while taking the order and the red diode is active if one of the system components is not available, or if the ordered product is not available in the database or for any other problem.

Thus, the invention allows an interaction between a customer and on-line service in which actions performed by the customer are sent to a server, while server responses are broadcast to the customer through reproduction means installed on the smart object.

Advantageously, this interaction may be applied independently of any effective order.

Nomenclature
Smart object 100
Order device 110
Optical capture device (barcode, image)
Voice recognition device,
Wireless communication module 120
Electrical power supply means 130
Order signal CMD
Image processing device
Network equipment for access to Internet 200
Server 300
Database 310
Computer 400

The invention claimed is:

1. A system for a customer to order a product on line comprising:
   network equipment for access to the Internet,
   a smart object comprising a control device comprising at least one device among an optical capture device, an audio recording device and a magnetic or electromagnetic capture device, the smart object being capable of communicating with the network equipment and being configured to order a first set of products referenced in a database through an order signal (CMP);
   the database structured according to a set of sort criteria, referencing a set of products and comprising a search engine configured to list a second set of products corresponding to the order signal (CMP);
   a server, accessible through the internet, in communication with the database and configured to publish the list of the second set of products on line from the database using the smart object;
   a computer, connected to the Internet, configured to access the server, through the network equipment or other network equipment enabling access to the Internet, to validate the list;
   wherein the smart object is portable equipment comprising a processor, RAM (Random Access Memory), and hibernation software in which, when the smart object is not used for a predetermined duration or as a function of the state of the smart object, the processor stops and the content of the RAM is not kept;
   wherein at least some products in the database are grouped in a set of predefined groups, each of the predefined groups being associated with a customer, identified by an individual name or an individual graphic symbol and corresponding to at least one database criterion; the user is enabled to define and modify the individual name, the individual graphic symbol or the content of a given one of the predefined groups, wherein the content of each of the predefined groups is associated with a predetermined number of persons;
   wherein,
   the order signal (CMD) is a voice signal, and
   the database comprises a correspondence between the name of a predefined group, products in the predefined group and a number of persons;
   the system further comprising a voice recognition device and a second.

2. A system according to claim 1, wherein the control device comprises an audio recording device configured to implement a voice recognition process comprising identification of a set of at least one keyword in a voice recording and verification that the set of at least one keyword corresponds to one of the at least one database sort criterion, the order signal (CMD) comprising the set of at least one keyword.

3. A system according to claim 1, wherein the database comprises a history of purchases made by the customer, wherein the second computer is configured to list products corresponding to the order signal (CMD) by using the order signal (CMD) combined with the history of the purchases made by the customer.

4. A system according to claim 1, wherein at least some of the set of sort criteria in the database are hierarchized, such that one of the set of sort criterion may be a subset of another one of the set of sort criterion.

5. A system according to claim 1, wherein the database comprises a memory space in which the customer can record correspondence between the individual name or individual graphic symbol of a group and products in the predefined group.

6. A system according to claim 1 wherein the database comprises a set of cooking recipes or communicates with a cooking recipe database.

7. A system according to claim 1 further comprising a sound reproduction device.

* * * * *